United States Patent Office 3,254,524
Patented June 7, 1966

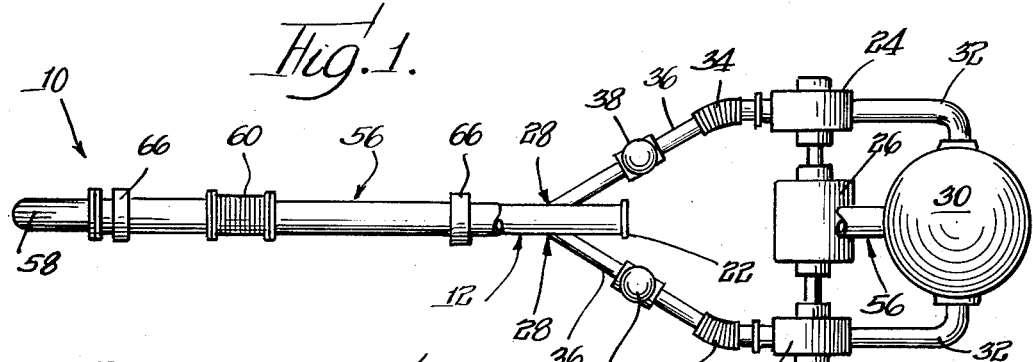
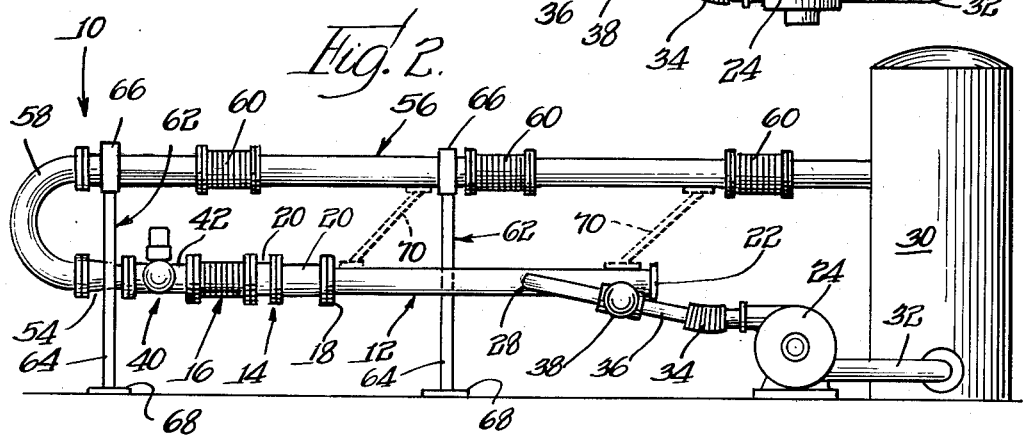
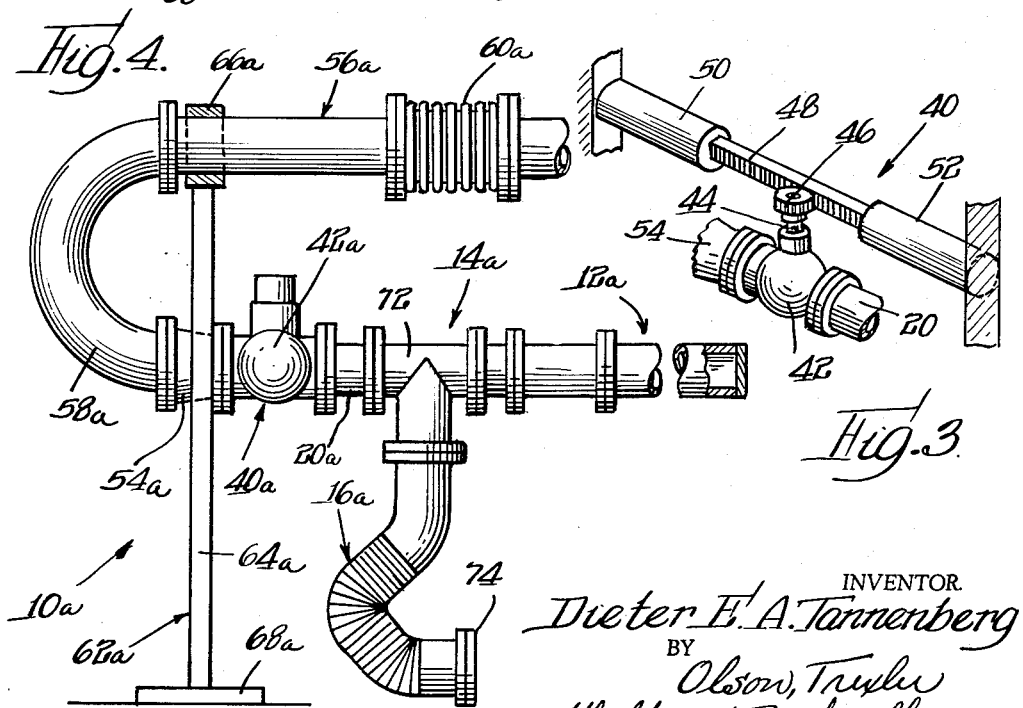

---

3,254,524
VARIABLE CONTROLLED WATER HAMMER GENERATOR
Dieter E. A. Tannenberg, Palatine, Ill., assignor to Calumet & Hecla, Inc., Chicago, Ill., a corporation of Michigan
Filed Jan. 16, 1963, Ser. No. 251,873
12 Claims. (Cl. 73—12)

This invention relates generally to test equipment and more particularly to testing apparatus in which a mechanical shock wave is generated in a moving fluid.

When the movement of a fluid is suddenly obstructed or the velocity substantially reduced, the kinetic energy which arises by virtue of the velocity of the fluid causes the fluid to be compressed in the immediate vicinity of the obstruction. The local expansion of the fluid which follows the maximum compression appears as a reversely directed pressure or shock wave that is thereupon propagated through the fluid. This phenomenon is commonly referred to as "water hammer" even though its generation is not limited to water as the carrier fluid.

The concussions available from water hammer are a potentially useful means of testing the strength and shock resistance of various commercial components, especially those intended to transport large volumes of fluid at comparatively high pressures; and in the past, equipment has been constructed to utilize the impulses from water hammer as a testing medium. However, such equipment has exhibited numerous deficiencies. One well-known scheme for generating and controlling water hammer for test purposes calls for a piping system to extend from an elevated reservoir to a valve disposed at a much lower position, a mountainside location being necessary to develop sufficient gravity head for generating large magnitude water hammer impact pressures. Moreover, this scheme requires dumping of the water from the lower end of the line and hence is restricted to use of an inexpensive fluid.

Therefore, an important object of the present invention is to provide apparatus which is capable of generating large magnitude water hammer impact pressures and which is sufficiently compact to be housed in an ordinary building.

A further object of the invention is to provide a water hammer generator that is embodied for recirculation of the test fluid whereby to permit simultaneous flow and shock testing even when an expensive fluid is required for the flow test.

In addition, I have discovered that it is sufficient to mount the test specimen in mere fluid communication with the moving fluid, it being unnecessary to mount the test specimen so as to be part of the conduit carrying the actual flow of test fluid. Hence, a still further object of the invention is to provide water hammer generating apparatus which can accommodate specimens of irregular shape.

A more general object of the invention is to provide new and improved apparatus for generating and controlling a mechanical shock wave in a moving fluid.

Another object of the invention is to provide apparatus of the type described which is characterized by the development of highly reproducible results.

Still another object of the invention is to provide apparatus of the type described which is arranged to avoid damage by the generated shock waves.

These and other objects and features of the invention will become more apparent from a consideration of the following disclosure.

In order that the principles of the invention may be more readily understood, two embodiments thereof but to which the application is not to be restricted are shown in the accompanying drawing wherein:

FIG. 1 is a top plan view of apparatus for generating and controlling a mechanical shock wave in a moving fluid, the apparatus being constructed in accordance with the present invention;

FIG. 2 is a side elevational view of the apparatus of FIG. 1;

FIG. 3 is an enlarged perspective view of the fast-acting valve and the associated actuating means used in the apparatus of FIGS. 1 and 2; and FIG. 4 is an enlarged, fragmentary side elevational view of a modified embodiment of the apparatus of the invention.

Referring now in detail to the drawing, specifically to FIGS. 1 and 2, an apparatus 10 is shown embodied for generating and controlling a mechanical shock wave in a moving fluid. The apparatus 10 includes a main fluid transfer line 12 which is provided with a coupling section 14 at one end. The coupling section 14 is adapted to connect a tubular test specimen 16 to the main line 12 in fluid communication with the interior thereof; and the coupling section 14 advantageously includes both a mounting flange 18 which is secured to the end of main line 12 and a suitable number of flanged section 20 whereby to accommodate the length of various sized test specimens.

The opposite end of main line 12 is closed off with a buttress plate 22 that is secured in place by welding or other suitable means, the buttress plate 22 being particularly selected from thick stock in order that it may resist shock waves impressed upon it, as will become more apparent hereinafter.

The apparatus 10 also incorporates pump means for delivering fluid under pressure to the main line 12 intermediate the ends thereof; and in the embodiment of FIGS. 1 and 2, these pump means include a pair of centrifugal pumps 24 which are driven by an electric motor 26 and which are arranged individually to deliver fluid under pressure to the main line 12 at symmetrically disposed locations 28. The pumps 24 withdraw a suitable test fluid, such as for example water, from a reservoir 30 through conduits 32. In addition, each pump 24 delivers its output through an elbow 34, a conduit 36 and a control valve 38, all of which are connected in series fluid circuit. Buttress plate 22 is situated fairly close to the locations 28 to avoid the creation of a "dead space" that would tend to act as a shock absorber.

It is important to observe that the conduits 36 enter the main line 12 at an acute relative to the longitudinal axis of that line. This arrangement promotes a relatively smooth flow from the pumps to the main line and also tends to protect the pumps from the shock waves which are generated in the fluid moving through the main line 12. Moreover, it is important to realize that centrifugal pumps are employed in the apparatus of the invention because of their ability to maintain a given pressure accurately and regardless of the volumetric flow. Thus, bypass valves and the like are unnecessary, and highly reproducible results are obtained. The valves 38 control the volume of flow to the main line 12 and hence control one of the factors necessary to generate a water hammer of a selected magnitude.

In order that the moving fluid in main line 12 may be suddenly halted in order to generate a water hammer, a fast-acting valve arrangement 40 is connected to the main line 12 downstream from the coupling section 14 and the test specimen 16. With reference to FIG. 3, the fast-acting valve arrangement 40 is shown to include a ball valve unit 42 provided with an operator shaft 44. The ball valve unit 42 employs a ball fabricated from an aluminum alloy so as to reduce its inertia; and the fluid passageway through the ball is fashioned with a venturi throat to minimize the pressure drop across the valve. Furthermore, a pinion 46 is fixed to the operator shaft 44 and is positioned to mesh with a rack 48 that extends between opposed, pneumatic cylinders 50 and 52. If desired, an idler rack may be disposed on the otherwise free side of pinion 46 to prevent lateral thrust on the valve ball. The operation of cylinders 50 and 52 is coordinated in order to achieve rapid traverse of the rack 48 and thus rapid actuation of the ball valve unit 42. Specifically, when cylinder 50 is pressurized to extend rack 48 therefrom, cylinder 52 is exhausted to retract the rack 48 therein.

The described fast-acting valve arrangement 40 is readily capable of achieving rapid obstruction of flow through the main line 12. For example, it is known that hydraulic surges of the character of water hammer take place only if the valve closing time is less than a function of twice the upstream length of the fluid line divided by the propagation velocity of the pressure wave. In one specific embodiment of the invention, critical valve closing times have been found to be on the order of 50 milliseconds; and the described fast-acting valve arrangement has achieved closing times well within this limitation.

Returning to FIG. 2, it will be noted that the fast-acting valve arrangement 40 is situated closely adjacent the test specimen 16 and the coupling section 14 provided therefor. This arrangement has been found to maximize the exposure of the test specimen to the generated shock waves. On the other hand, the opposite side of the valve 42 is coupled to an enlarging fitting 54 in order to minimize exposure of the downstream side of the valve to a shock wave. For example, the enlarging fitting 54 may present a 10-inch diameter at its smaller, upstream end and a 12-inch diameter at its larger, downstream end. When the test specimen is disposed closely adjacent the fast-acting valve arrangement, the specimen is exposed to nearly the full impact of the surge pressure; and the attenuating effects of the viscosity of the fluid and the elasticity of the piping system are minimized.

In order that it may define a closed system capable of recirculating operation, the apparatus 10 additionally includes a return line 56 which is connected to the reservoir tank 30 at one end and which is connected at its other end to the fitting 54 by means of a 180° elbow 58. The return line 56 and the elbow 58 advantageously take a diameter corresponding to the diameter of the downstream or outlet side of the fitting 54 in order to continue the expansion or enlargement of the outlet from valve arrangement 40 whereby to insure against development of water hammer in the return line or in the reservoir tank. Compensator units 60 made of corrugated tubing may be provided in the return line 56 to permit adjustment in the length of the return line for accommodating various length test specimens at the coupling section 14.

The 180° elbow 58 achieves a desirable folding of the piping system comprising the lines 12 and 56; and the apparatus 10 is thus made relatively compact and capable of occupying but reasonable amounts of floor space in a factory or testing laboratory. Some additional reduction in the floor space requirement is realized by arranging the main line 12 and the return line 56 in parallel, vertically overlapping relationship as is shown in FIG. 2. In such instance, it is advantageous to support the return line 56 by means of triangular pedestals 62. Each of the pedestals 62 comprises a pair of legs 64 which diverge downwardly and away from a ring support 66 and which terminate in feet 68, the feet 68 resting on the floor of the room in which the apparatus 10 is located. The ring supports 66 loosely grip the return line 56 so as to accommodate alterations in the axial length of the return line as for purposes of adjusting to the length of a given test specimen.

It has also proved advantageous to provide a number of brace elements or tie rods 70 mechanically interconnecting the main line 12 and the return line 56. The tie rods 70 provide a balancing action. Specifically, upon closing of the valve 42, the main line 12 tends to move in one horizontal direction whereas the return line 56 tends to move in an opposite direction. The tie rods 70 counteract these tendencies; and with these tendencies balanced, the shock effect of the water hammer is sharpened. Hanger straps, not shown, are advantageously suspended from the return line 56 to support the main line 12. In order to maintain the lines 12 and 56 full of the test fluid, the lines are inclined slightly upwardly in an upstream direction.

Having thus described one construction of the invention, it is advantageous now to state how the illustrated embodiment operates. Assuming that the system is filled with a suitable fluid and further assuming that the pumps 24 are being operated by the motor 26 so as to cause a given flow of fluid through the system, a water hammer is caused by operating the ball valve 42 so as to obstruct the flow. This is achieved by properly pressurizing the cylinders 50 and 52. The resultant abrupt termination of flow produces a sharply defined pressure wave in the fluid, and this pressure wave is propagated from the immediate vicinity of the face of the ball of valve 42 and radiates in the general direction of the buttress plate 22. Because of its proximity to the valve 42, the test specimen 16 is subjected to near maximum impact pressure from this wave.

The pressure wave thus generated progresses down the main line 12 until it reaches the buttress plate 22. The buttress plate absorbs a certain amount of the energy in the pressure wave and reflects the remainder back down the main line 12 toward the fast-acting valve arrangement 40. Operation of the ball valve 42 may be timed so that, when this reflected wave reaches the valve arrangement, the valve ball is rotated to flow-passing condition whereby to transmit the reflected wave into the elbow 58 and from there into the return line 56. Any residual energy in this pressure wave is absorbed in the fluid contained within the reservoir tank 30. If a water hammer of greater or lesser magnitude is desired, the valves 38 are appropriately manipulated to increase or decrease the velocity head in the fluid flowing through the main line 12. It will be recognized that, because of the in-line connection of the test specimen 16, flow testing in which the internal surfaces of the specimen are subjected to a given fluid may be conducted simultaneously with shock testing. Moreover, actuation of the valve 42 may be achieved through automatic control means or by manual manipulation as is desired in a given test program.

While a particular embodiment of the invention has been thus far shown and described, it should be understood, of course, that the invention is not limited thereto since many modifications may be made. Therefore and turning to FIG. 4, a modified embodiment of the apparatus is seen to be indicated generally by the numeral 10a. Since certain similarities exist between the embodiment of FIG. 4 and the embodiment of FIGS. 1–3, like numerals have been used to designate like parts in the several figures, the suffix letter "a" being used to distinguish those elements associated with the embodiment of FIG. 4.

The apparatus 10a which is illustrated in FIG. 4 is particularly characterized by the incorporation of a T fitting 72 in the coupling section 14a. The T fitting 72 is disposed with its principal branch connected between the main line 12a and the fast-acting valve arrangement 40a. The lateral branch of the T fitting 72 is connected to a closed-end test specimen 16a, specimen 16a taking an irregular shape. With the otherwise open end of the specimen 16a closed by means of a plate 74, the specimen is not exposed to the flow of the fluid within the system but it is disposed in fluid communication therewith whereby to be exposed to the mechanical shock of the water hammer generated in the system by the actuation of fast-acting valve arrangement 40a.

The specific examples herein shown and described are to be considered as being primarily illustrative. Various changes in structure and arrangement will, no doubt, occur to those skilled in the art; and such changes are to be understood as forming a part of this invention insofar as they fall within the spirit and scope of the appended claims.

The invention is claimed as follows:

1. Apparatus for testing a tubular test specimen by generating and controlling a mechanical pressure shock wave in a normally moving fluid, said apparatus comprising: a main fluid transfer line having coupling means connected to said tubular test specimen in fluid communication with the interior thereof; pump means delivering fluid under pressure to said main line upstream from said coupling means; and fast-acting valve means connected to said main line downstream from said coupling means for suddenly terminating the flow of fluid through said line whereby to generate a pressure shock wave in the fluid contained within said line and within said test specimen and thereby subject the test specimen to the generated pressure shock wave.

2. Apparatus according to claim 1 wherein said fast-acting valve means is situated closely adjacent said test specimen coupling means whereby to maximize the exposure of the test specimen to the generated shock waves.

3. Apparatus according to claim 1 wherein said coupling means includes a T fitting with its principal branch connected between said main fluid line and said fast-acting valve means and with its lateral branch connected to a closed-end test specimen.

4. Apparatus according to claim 1 wherein said coupling means includes a flanged fitting for connecting the test specimen in series fluid circuit with said main line.

5. Apparatus for testing a tubular test specimen by generating and controlling a mechanical pressure shock wave in a normally moving fluid, said apparatus comprising: a main fluid transfer line having coupling means at one end connected to said tubular test specimen in fluid communication with the interior thereof; pump means delivering fluid under pressure to said main line intermediate the ends thereof and upstream from said coupling means, fast-acting valve means connected to said main line downstream from said coupling means for suddenly terminating the flow of fluid through said line whereby to generate a pressure shock wave in the fluid within said test specimen and thereby subject the test specimen to the generated pressure shock wave and fluid circuit means including a tank, first conduit means connecting said fast-acting valve means to said tank and second conduit means connecting said tank to said pump means whereby to establish a recirculating system for said fluid.

6. Apparatus according to claim 5 wherein said main fluid line and said first conduit means define substantially parallel disposed members and wherein said apparatus further includes at least one brace element connected to said members for preserving the substantial parallelism therebetween.

7. Apparatus for testing a tubular test specimen by generating and controlling a mechanical pressure shock wave in a normally moving fluid, said apparatus comprising: a main fluid transfer line having coupling means at one end connected to said tubular test specimen in fluid communication with the interior thereof, said main line further having a buttress plate closing off the other end thereof; pump means delivering fluid under pressure to said main line intermediate the ends thereof and upstream from said coupling means; and fast-acting valve means connected to said main line downstream from said coupling means for suddenly terminating the flow of fluid through said line whereby to generate a pressure shock wave in the fluid contained within said line and within said test specimen and thereby subject the test specimen to the generated pressure shock wave.

8. Apparatus for testing a tubular test specimen by generating and controlling a mechanical pressure shock wave in a normally moving fluid, said apparatus comprising: a main fluid transfer line having coupling means at one end connected to said tubular test specimen in fluid communication with the interior thereof; pump means delivering fluid under pressure to said main line intermediate the ends thereof, upstream from said means and at an acute angle relative to the longitudinal axis thereof; and fast-acting valve means connected to said main line downstream from said coupling means for suddenly terminating the flow of fluid through said line whereby to generate a pressure shock wave in the fluid contained within said line and within said test specimen and thereby subject the test specimen to the generated pressure shock wave.

9. Apparatus for testing a tubular test specimen by generating and controlling a mechanical pressure shock wave in a normally moving fluid, said apparatus comprising: a main fluid transfer line having coupling means connected to said tubular specimen in fluid communication with the interior thereof; pump means delivering fluid under pressure to said main line upstream from said coupling means and intermediate the ends thereof, including a plurality of pumps individually delivering fluid under pressure to said main line at symmetrically disposed locations; and fast-acting valve means connected to said main line downstream from said coupling means for suddenly terminating the flow of fluid through said line whereby to generate a pressure shock wave in the fluid contained within said line and within said tubular specimen and thereby subject the test specimen to the generated pressure shock wave.

10. Apparatus according to claim 9 wherein said pumps are centrifugal pumps.

11. Apparatus for testing a tubular test specimen by generating and controlling a mechanical pressure shock wave in a normally moving fluid, said apparatus comprising: a main fluid transfer line having coupling means connected to said tubular test specimen in fluid communication with the interior thereof; pump means delivering fluid under pressure to said main line upstream from said coupling means, and fast-acting valve means connected to said main line downstream from said coupling means for suddenly terminating the flow of fluid through said line whereby to generate a pressure shock wave in the fluid contained within said line and within said test specimen and thereby subject the test specimen to the generated pressure shock wave and including a ball valve having an operator and opposed, fluid-actuated cylinders mechanically coupled to said operator for operating said valve.

12. Apparatus for testing a tubular test specimen by generating and controlling a mechanical pressure shock wave in a normally moving fluid, said apparatus comprising: a main fluid transfer line having coupling means connected to said tubular test specimen in fluid communication with the interior thereof; pump means delivering fluid under pressure to said main line upstream from said coupling means; fast-acting valve means connected to said main line downstream from said coupling means for suddenly terminating the flow of fluid through said line whereby to generate a pressure shock wave in the fluid contained within said line and within said test specimen and thereby subject the test specimen to the generated pressure shock wave; and fluid circuit means connected to said main line downstream from said valve means and connected to the inlet of said pump means to define a recirculating loop for said fluid.

References Cited by the Examiner

UNITED STATES PATENTS

| | | | |
|---|---|---|---|
| 1,861,684 | 6/1932 | Dague | 73—12 |
| 1,909,703 | 5/1933 | Moore et al. | 73—12 |
| 2,895,328 | 7/1959 | Payne et al. | 73—49.4 X |
| 2,994,480 | 8/1961 | Carter | 237—63 |
| 3,107,080 | 10/1963 | Priese | 251—250 |
| 3,151,478 | 10/1964 | Heldenbrand | 73—49.1 X |

OTHER REFERENCES

Gibson, A. H.: "Water Hammer in Hydraulic Pipe Lines," Archibald Constable Co., Ltd., London, 1908, p. 20, FIG. 4.

Gibson, A. H.: Water Hammer in Hydraulic Pipe Lines, Archibald Constable & Co., Ltd., London, 1908, pp. 36–39 relied upon.

RICHARD C. QUEISSER, *Primary Examiner.*

JOSEPH P. STRIZAK, *Examiner.*

LOUIS MOK, J. JOSEPH SMITH, Jr,

*Assistant Examiners.*